(12) United States Patent
Han

(10) Patent No.: US 9,418,137 B2
(45) Date of Patent: Aug. 16, 2016

(54) DATABASE WITHOUT STRUCTURED QUERY LANGUAGE

(71) Applicant: Sherwin Han, Portsmouth, RI (US)

(72) Inventor: Sherwin Han, Portsmouth, RI (US)

( * ) Notice: Subject to any disclaimer, the term of this patent is extended or adjusted under 35 U.S.C. 154(b) by 0 days.

(21) Appl. No.: 14/835,231

(22) Filed: Aug. 25, 2015

(65) Prior Publication Data

US 2016/0063084 A1 Mar. 3, 2016

Related U.S. Application Data

(60) Provisional application No. 62/043,465, filed on Aug. 29, 2014.

(51) Int. Cl.
*G06F 17/30* (2006.01)

(52) U.S. Cl.
CPC .... *G06F 17/30595* (2013.01); *G06F 17/30339* (2013.01); *G06F 17/30483* (2013.01); *G06F 17/30498* (2013.01)

(58) Field of Classification Search
CPC ................................................. G06F 17/30339
See application file for complete search history.

(56) References Cited

U.S. PATENT DOCUMENTS

| | | | |
|---|---|---|---|
| 6,038,392 A | 3/2000 | Ashar | |
| 6,247,164 B1 | 6/2001 | Ashar | |
| 6,611,841 B1 * | 8/2003 | Han | G06N 5/022 |
| 6,728,728 B2 | 4/2004 | Spiegler | |
| 7,120,569 B2 | 10/2006 | Arroyo-Figueroa | |
| 7,194,710 B2 | 3/2007 | Prasad | |
| 7,418,369 B2 | 8/2008 | Moskewicz | |
| 7,543,266 B2 | 6/2009 | Brown, Jr. | |
| 7,565,634 B1 | 7/2009 | Boyd | |
| 9,031,890 B2 | 5/2015 | Han | |
| 2005/0182273 A1 | 8/2005 | Eh | |
| 2005/0182773 A1 | 8/2005 | Feinsmith | |
| 2009/0192963 A1 | 7/2009 | Sankaranarayanan | |
| 2009/0319461 A1 | 12/2009 | Meek | |

(Continued)

FOREIGN PATENT DOCUMENTS

| | | | |
|---|---|---|---|
| WO | 2014152541 A1 | 9/2014 | |
| WO | 2014165752 A1 | 10/2014 | |

OTHER PUBLICATIONS

Cook, S., "The P versus NP Problem." Manuscript prepared for the Clay Mathematics Institute for the Millennium Prize Problems. (Apr. 2000) 12 pp. Available from the Clay Mathematics Institute.

(Continued)

*Primary Examiner* — Kris Mackes
(74) *Attorney, Agent, or Firm* — Robert Plotkin, P.C.; Robert Plotkin

(57) ABSTRACT

A database system uses an iterative set to store data and relationships among the data in a parallel manner. Unlike a relational database, which is limited to representing two-dimensional relationships (i.e., relationships between pairs of tables), the database system of the present invention may represent N-dimensional relations in a three-dimensional coordinate system. Furthermore, the database system of the present invention may store all database data in a single iterative set, without the need to use multiple tables. As a result of the manner in which data and relationships among data are stored by embodiments of the present invention, embodiments of the present invention may be used to search the database without the need to formulate queries in a formal query language such as SQL.

22 Claims, 6 Drawing Sheets

(56) References Cited

U.S. PATENT DOCUMENTS

| | | |
|---|---|---|
| 2010/0131490 A1 | 5/2010 | Lamb |
| 2011/0010412 A1 | 1/2011 | Macready |
| 2011/0016157 A1 | 1/2011 | Bear |
| 2011/0213766 A1 | 9/2011 | Hong |
| 2011/0218978 A1 | 9/2011 | Hong |
| 2012/0317094 A1 | 12/2012 | Bear |
| 2013/0179378 A1 | 7/2013 | Han |
| 2014/0095527 A1* | 4/2014 | Mohania ............ G06F 17/3043 707/766 |
| 2014/0207839 A1 | 7/2014 | Han |
| 2014/0289181 A1 | 9/2014 | Han |
| 2015/0074024 A1 | 3/2015 | Han |
| 2016/0012339 A1 | 1/2016 | Han |

OTHER PUBLICATIONS

Han, Sherwin, "Hierarchical Dual Memory Structure Determines Cognitive Logic of the Human Brain," In: Proceedings of 7th IEEE Internationai Conference on Cognitive Informatics (ICCI 2008), pp. 332-340, Aug. 14-16, 2008.

Han et al., "3-SAT Polynomial Solution of Knowiedge Recognition Algorithm," arXiv:1009.3687, Submitted to Cornell University Library on Sep. 20, 2010. 5 pp. Available at: http://arxiv.org/pdf/1009.3687v12.pdf.

Karp, R., "Reducibility Among Combinatorial Problems." in R. E. Miller and J, W. Thatcher (editors). Complexity of Computer Computations. New York: Plenum. pp. 85-103. (1972).

Wen, H., "Knowledge Recognition Algorithm enables P = NP," arXiv:1009.0884, Submitted to Cornell University Library, Sep. 2010, pp. 1-3.

Zhang, L., Madigan, C. F. Moskewicz, M. W. , andMalik, S. 2001. "Efficient conflict driven learning in a Boolean satisfiability solver." In Proceedings of the International Conference on Computer-Aided Design (ICCAD 2001). 279-285.

Zhou, Jiayu, et al., "Unified Hierarchical Iterate Model of Human Conceptualization and Cognition," In: Proceedings of 8th IEEE International Conference on Cognitive Informatics (ICCI 2009), pp. 44-51, Jun. 14-17, 2009.

"A Probabilistic 3-SAT Algorithm Further Improved" ; Thomas Hofmeister, Uwe Schoning, Rainer Schuler, Osamu Watanabe. Dept. of Mathematical and Computing Sciences, Tokyo Institute of Technology, Meguro-ku Ookayama, Tokyo 152-8552, Japan. H. Alt and A. Ferreira (Eds.): STACS 2002, LNCS 2285, pp. 192-202, 2002. Springer-Verlag Berlin Heidelberg 2002.

\* cited by examiner

| | 304a | 304b | 304c | 304d |
|---|---|---|---|---|
| | NAME | CAR | SSN | LOCATION |
| 302a | NANCY BLACK | DODG | 199-23-3333 | BOSTON |
| 302b | KAREN BROWN | TOYOTA | 058-44-1234 | BOSTON |
| 302c | JOE WHITE | BMW | 144-33-6666 | CHICAGO |
| | ... | | | |

TABLE-SALE FROM DATABASE 1

FIG. 3A

| | 324a | 324b | 324c |
|---|---|---|---|
| | NAME | TELEPHONE | SSN |
| 322a | MARY ANDERSON | 617-585-9923 | 177-86-9922 |
| 322b | KAREN BROWN | 570-524-3333 | 058-44-1234 |
| 322c | BILL CLARK | 505-483-4467 | 139-39-3939 |
| | ... | | |

TABLE-CONNECT FROM DATABASE 1

FIG. 3B

| | 344a | 344b | 344c |
|---|---|---|---|
| | NAME | AGE | SSN |
| 342a | BILL GATES | 22 | 273-86-9332 |
| 342b | KAREN BROWN | 33 | 058-44-1234 |
| 342c | CARO GREEN | 44 | 039-33-5678 |
| | ... | | |

TABLE-RESUME FROM DATABASE 2

| KEY | ATTRIBUTES |
|---|---|
| ... | |
| 101 | NAME |
| 102 | CAR |
| 103 | TELEPHONE |
| 104 | SSN |
| 105 | LOCATION |
| 106 | AGE |
| ... | |

404a = KEY column; 404b = ATTRIBUTES column
402a → 101; 402b → 102; 402c → 103; 402d → 104; 402e → 105; 402f → 106

PROVIDE UNIFIED KEYS TO THE ATTRIBUTES

| KEY | VALUE |
|---|---|
| ... | |
| 201 | BMW |
| 202 | TOYOTA |
| ... | |
| 301 | NANCY BLACK |
| 302 | KAREN BROWN |
| ... | |
| 404 | 570-524-3333 |
| ... | |
| 505 | BOSTON |

414a = KEY column; 414b = VALUE column
412a → 201; 412b → 202; 412c → ...; 412d → 301; 412e → 302; 412f → ...; 412g → 404; 412h → ...; 412i → 505

PROVIDE UNIFIED KEYS TO THE VALUES

FIG. 4B

DATABASE WITHOUT STRUCTURED QUERY LANGUAGE

BACKGROUND

Relational databases have become the standard for storing large datasets. In general, a relational database consists of multiple tables. Each row in each such table (also referred to as a "record") contains multiple columns (also referred to as "fields"). Each table has a particular column, which is referred to as the table's "primary key," and which is used to uniquely identify each record in the table. For example, a table may have a "unique identifier" column, and the value of the unique identifier column in each record in the table may be unique among all records in the table. Different tables in the relational database may be related to each other by referring to the primary key of a first table within a column of a second table. In this case, the first table's primary key within the second table plays the role of a "foreign key" within the second table. For example, a table of employee birthdays may refer to employees by their Social Security Number (foreign key), where Social Security Number is the primary key of another table containing other information about employees.

One benefit of relational databases in comparison to databases consisting of only a single table is that a relational database may represent relations among multiple sets of data. As a result, existing but disparate sets of data may be linked together in a single relational database without requiring all of the sets of data to be reformatted to share the same structure. Instead, to bring together disparate data sets into a single relational database, only the relations (primary keys and foreign keys) need to be encoded into the data sets. This can enable operations, such as searching and sorting, to be performed on disparate data sets with relatively little effort in comparison to the effort of combining all data sets into a single table.

Despite the benefits of relational databases, relational databases also have a variety of drawbacks. For example, to search a relational database typically requires formulating a query in a formal query language, such as Structured Query Language (SQL). SQL is a complex language, and formulating a query in SQL can require significant technical expertise. Furthermore, formulating a query in SQL requires detailed knowledge of the structure (e.g., columns, primary keys, and primary-foreign key relations) of the relational database to be searched. As a result, formulating a query in SQL can be tedious, time-consuming, and error-prone.

Furthermore, because the relations in relational databases are based on relations between predetermined primary keys in distinct tables, the relations that can be represented in a relational database are inherently restricted to the relations that can be formed between primary keys in the relational database. As a result, queries formulated in SQL and executed on a relational database can only be used to search for relations that have been encoded into the database using relations between existing, predetermined, primary keys in the relational database.

What is needed, therefore, are techniques for overcoming these limitations of relational databases and of SQL-based searching.

SUMMARY

A database system uses an iterative set to store data and relationships among the data. Unlike a relational database, which is limited to representing two-dimensional relationships (i.e., relationships between pairs of tables), the database system of the present invention may represent N-dimensional relations in a three-dimensional coordinate system. Furthermore, the database system of the present invention may store all database data in a single iterative set, without the need to use multiple tables. As a result of the manner in which data and relationships among data are stored by embodiments of the present invention, embodiments of the present invention may be used to search the database without the need to formulate queries in a formal query language such as SQL.

Other features and advantages of various aspects and embodiments of the present invention will become apparent from the following description and from the claims.

BRIEF DESCRIPTION OF THE DRAWINGS

FIGS. 3A-3C are diagrams representing tables implemented according to a conventional relational database system;

FIGS. 4A-4C are portions of a single table used by embodiments of the present invention.

DETAILED DESCRIPTION

The present patent application relates to PCT Pat. App. Ser. No. PCT/US2014/032965, filed on Apr. 4, 2014, entitled, "A Polynomial Method of Constructing a Non-Deterministic (NP) Turing Machine," which is hereby incorporated by reference herein. That patent application describes techniques for constructing a non-deterministic Turing machine (NTM) from a deterministic Turing machine (DTM). As described therein, a non-deterministic Turing machine may be thought of as a knowledge reasoning machine which works in a manner that is similar to the human brain. In each situation, a non-deterministic Turing machine may make many choices in parallel to move towards the solution of a problem. In contrast, a deterministic Turing machine is a transition function machine; that is, in any given situation, a deterministic Turing machine makes exactly one choice, and does not have the ability to pursue other choices in parallel. Therefore, the most significant difference between a deterministic Turing machine and a non-deterministic Turing machine is that the former cannot perform processing in parallel, while the latter can perform processing in parallel.

In general, nondeterministic Turing machines (NTMs) implemented according to the above-referenced patent application include four subsystems: (1) a spatial binary enumeration system; (2) a 3-dimensional relation system; (3) a simulated human logic system; and (4) a bijective-set memory system. The above-referenced patent application provides further details about each such subsystem and about how such subsystems interact with each other.

Figure 1:
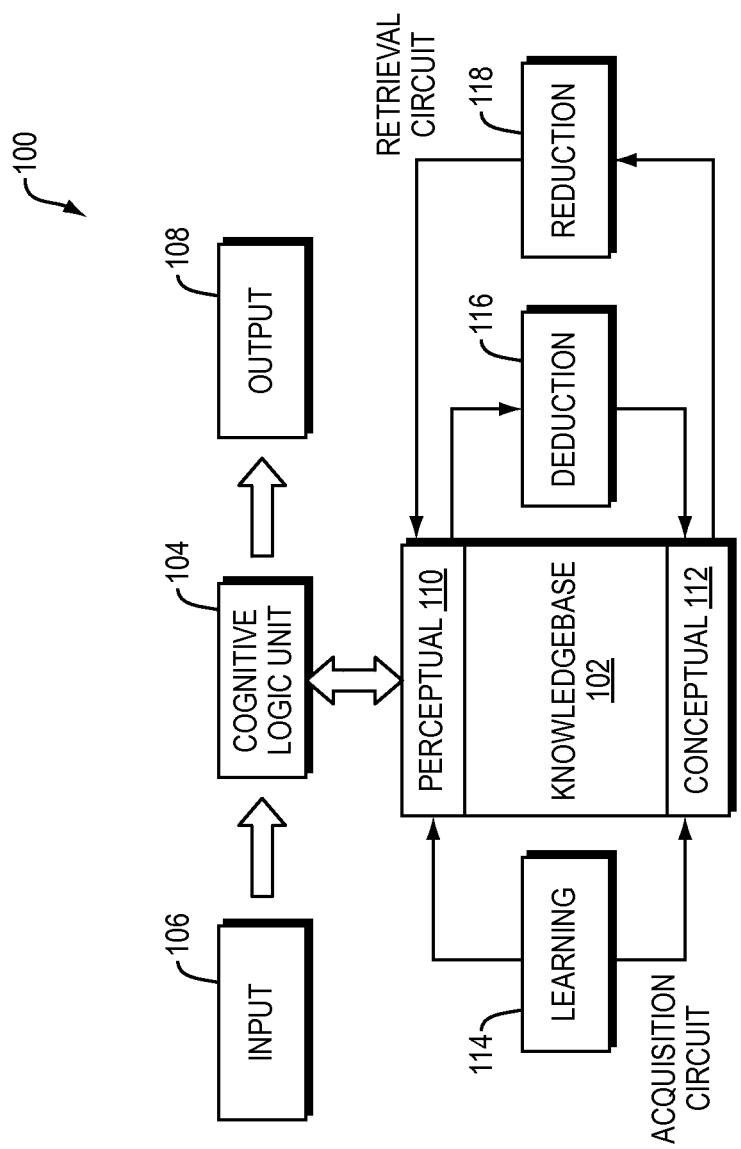
FIG. 1 is a diagram of a nondeterministic Turing machine according to one embodiment of the present invention.

For example, referring to FIG. 1, a diagram is shown of a nondeterministic Turing machine (NTM) 100 according to one embodiment of the present invention. The NTM 100 includes a memory 102, referred to herein as a "bijective set" memory, because it contains data representing bidirectional relationships, as will be described in more detail below. The memory 102 is also referred to herein as a "knowledgebase," as that term is used in U.S. Pat. No. 6,611,841. The NTM 100 also includes a simulated human logic system 104, which is also referred to herein as a cognitive logic unit or a parallel information processor. The cognitive logic unit 104 does not work in the same way as a conventional central processing unit (CPU). Rather, the cognitive logic unit 104 works as a "set operator," which causes the entire NTM 100 to work as a set operator. The cognitive logic unit 104 reads input 106 and, based on the input and the contents of the memory 102, produces output 108. For example, and as will be described in more detail below, the cognitive logic unit 104 may perform one or more set operations on its input 106 (e.g., deductively and/or reductively) to produce its output 108, which represents the result of performing the set operation(s) on the input 106. Since the NTM 100 is nondeterministic, the bijective set memory 102 may contain data representing relationships among data in the sense described above in the Background section. The entire NTM 100, however, may be implemented using a deterministic Turing machine (DTM). In such embodiments, the NTM 100 uses a DTM to perform the functions of an NTM. The NTM 100 may, therefore, use a DTM to construct an NTM.

Examples of the bijective set memory 102, and of techniques for storing data in the bijective set memory, are described in more detail in U.S. Pat. No. 6,611,841, entitled, "Knowledge Acquisition and Retrieval Apparatus and Method," issued on Aug. 26, 2003; U.S. Prov. Pat. App. No. 61/798,848, entitled, "Sequence Alignment," filed on Mar. 15, 2013; and PCT App. No. PCT/US2014/027455, entitled, "Spatial Arithmetic Method of Sequence Alignment," filed on Mar. 14, 2014, all of which are hereby incorporated by reference herein.

A very brief summary of the bijective set memory 102 will be provided here. Further details are available in the above-referenced documents. In general, the bijective set memory 102 is based on an understanding of, and operates in a manner that is analogous to, the operation of the human brain. In particular, the bijective set memory 102 may contain two memories: a perceptual memory 110 and a conceptual memory 112. The perceptual memory 110 stores data representing perceptions, such as perceptions of objects. The conceptual memory 112 stores data representing conceptions (also referred to herein as concepts and classes). The conceptions represented by data stored in the conceptual memory 112 may be considered to be sets, while the perceptions represented by data stored in the perceptual memory 110 may be considered to be elements of the sets represented by the data stored in the conceptual memory 112.

The NTM 100 includes an induction module 114 (also referred to herein as a learning module or a concept formation module), which learns natural relationships between perceptions represented by data stored in the perceptual memory 110 and concepts represented by data stored in the conceptual memory 112, using a process of induction. For each relationship that the learning module 114 learns between a perception in the perceptual memory 110 and a corresponding concept in the conceptual memory 112, the learning module 114 generates and stores a two-way mapping between the data representing the perception in the perceptual memory 110 and the data representing the corresponding concept in the conceptual memory 112. The process performed by the learning module 114 of generating and storing such mappings for an increasingly large number of perceptions and corresponding concepts models the learning process performed by the human brain. The resulting set of mappings is an example of a "knowledgebase" as that term is used herein, and as that term is used in U.S. Pat. No. 6,611,841.

Once the learning module 114 has developed a knowledgebase containing two-way mappings between the perceptions represented by data stored in the perceptual memory 110 and the concepts represented by data stored in the conceptual memory 112, knowledge stored in the knowledgebase 102 may be retrieved in any of a variety of ways. For example, the NTM 100 includes a deduction module 116 which may retrieve knowledge from the knowledgebase 102 using deduction. In particular, if data representing a perception in the perceptual memory 110 is provided as input to the deduction module 116, then the deduction module 116 may follow the mapping(s) (i.e., relationships) from the perception in the perceptual memory 110 to the corresponding concept(s) in the conceptual memory 112, and thereby retrieve the concept (s) that correspond to the perception.

As another example, the NTM 100 includes a reduction module 118 which may retrieve knowledge from the knowledgebase using reduction. In particular, if data representing a class (also referred to herein as a concept, conception, or set) in the conceptual memory 112 is provided as input to the reduction module 118, then the reduction module 118 may follow the mapping(s) from the concept in the conceptual memory 112 to the corresponding perception(s) in the perceptual memory 110, and thereby retrieve the perception(s) that correspond to the concept.

As mentioned above, NTMs implemented according to embodiments of the present invention include a spatial binary enumeration system, which refers to an enumeration system which enumerates numbers based on a set consisting of two fundamental (primitive) elements, which may be conceived of as representing +1 and −1.

Therefore, although the conventional binary number system also is based on two fundamental (primitive) elements, namely 0 and 1, the spatial binary enumeration system disclosed herein has a variety of advantages over the conventional binary number system that is based on 0 and 1. In particular, the spatial binary enumeration system disclosed herein is based on primitive elements having values that are equal in magnitude and opposite (i.e., complementary) in direction to each other, such as −1 and +1. In contrast, the primitive values of 0 and 1 in the conventional binary number system are not equal and opposite to each other. The spatial binary enumeration system's use of primitive values that are equal in value but opposite in direction to each other enables computations to be performed more efficiently than using the conventional binary number system.

As will be described in more detail below, the use of +1 and −1 as primitive values enables numbers represented as combinations of +1 and −1 to be represented as three-dimensional points in a three-dimensional space more easily and directly than numbers represented as combinations of +1 and 0. This further facilitates use of such numbers to perform arithmetic (such as multiplication, division, addition, or subtraction), factorization, and other arithmetic and logical operations more easily than conventional binary numbers composed of primitive values of 0 and 1.

Because the use of +1 and −1 to represent numbers is new, there is no existing terminology to refer to a number which has permissible values consisting of the set {+1, −1}. The existing term "bit" refers to a number which has a range of permissible values consisting of the set {+1, 0}. For ease of explanation, and because embodiments of the present invention may use either a representation based on {+1, 0} or {+1, −1}, the term "bit" will be used herein to refer both to numbers that have a range of permissible values consisting of the set {+1, 0} and to numbers that have a range of permissible values consisting of the set {+1, −1}. Similarly, the term "binary number" will be used herein to refer to any number consisting of bits, whether such bits have a range of {+1, 0} or {+1, −1}. For example, both the number 10011010 and the number +1−1−1+1+1−1+1−1 will be referred to herein as "binary numbers," even though the number +1−1−+1 1 1+1+ 1−1+1−1 does not contain "bits" in the conventional sense. The term "spatial binary number" will be used to refer specifically to numbers containing bits having a range of {+1, −1} when it is desired to refer to such numbers specifically.

As mentioned above, NTMs implemented according to embodiments of the present invention include a 3-dimensional relation system. Such a system is described in detail in U.S. patent application Ser. No. 14/191,384, filed on Feb. 26, 2014, entitled, "Spatial Arithmetic Method of Integer Factorization," and published as U.S. Pat. App. Pub. No. 2014/0207839 A1 on Jul. 24, 2014, which is hereby incorporated by reference herein.

As further mentioned above, NTMs according to embodiments of the present invention include a simulated human logic system. Simulated human logic systems implemented according to embodiments of the present invention are built on the recognition that there is a natural order to the three-dimensional relation system and to knowledge more generally. For example, the human brain naturally sorts information in order to organize it. Similarly, nature automatically connects proteins to each other in certain orders and not others. Similarly, logic systems implemented according to embodiments of the present invention automatically organize information into relations within the bijective set memory 102.

The cognitive logic unit 104 may perform a variety of functions, such as the induction, deduction, and reduction functions disclosed above in connection with the learning module 114 (which learns and stores relations), deduction module 116 (which maps element information to set information), and reduction module 118 (which maps set information to element information) in FIG. 1. For example, the cognitive logic unit 104 may receive input 106 (such as input received from a user of the NTM 100). In response to receiving the input 106, the cognitive logic unit 104 may control the learning module 114 to perform induction on the input 106 (and possibly on previous inputs received by the NTM 100 and/or on data already stored in the knowledgebase 102), and thereby to create and store new learned knowledge in the knowledgebase 102. The cognitive logic unit 104 may then produce output 108 based on the new learned knowledge, such as output representing a concept that the induction module 114 learned based on the input 106.

As another example, in response to receiving the input 106, the cognitive logic unit 104 may control the deduction module 116 to perform deduction on the input 106 (and possibly on previous inputs received by the NTM 100 and/or on data already stored in the knowledgebase 102), and thereby to extract existing data from the knowledgebase 102 representing one or more classes of which an object represented by the input 106 is a member. The cognitive logic unit 104 may then produce output 108 based on the result of the deduction, such as output representing a class which contains an object represented by the input 106.

As another example, in response to receiving the input 106, the cognitive logic unit 104 may control the reduction module 118 to perform reduction on the input 106 (and possibly on previous inputs received by the NTM 100 and/or on data already stored in the knowledgebase 102), and thereby to extract existing data from the knowledgebase 102 representing one or more objects which are members of a class represented by the input 106. The cognitive logic unit 104 may then produce output 108 based on the result of the reduction, such as output representing one or more objects which are members of a class represented by the input 106.

As these examples illustrate, the cognitive logic unit 104 may trigger one or more of the learning module 114, the deduction module 116, and the reduction module 118 to perform their respective functions on the input 106, and the cognitive logic unit 104 may produce output 108 based on the results of the functions performed by such modules. The cognitive logic unit 104 may, therefore, act as an interface between a user of the NTM 100 and the modules 114, 116, and 118. The cognitive logic unit 104 may, therefore, also act as a controller of the modules 114, 116, and 118. The cognitive logic module 104 may retrieve data (representing existing knowledge) from the knowledgebase 102 using the modules 114, 116, and 118. Furthermore, the cognitive logic module 104 may store data (representing new knowledge) in the knowledgebase 102 using the modules 114, 116, and 118.

Logic systems implemented in the cognitive logic unit 104 according to embodiments of the present invention perform a variety of functions and provide a variety of benefits. For example, such logic systems enable knowledge to be learned automatically in the manner disclosed herein. In natural language and natural numbers there exist natural relations and natural logic. Humans can perceive these hidden relations automatically, but current computers are not equipped to process these relations. The cognitive logic unit 104 provides the ability to recognize natural relations, such as natural relations expressed in natural languages and natural numbers. As another example, the cognitive logic unit 104 enables knowledge to be processed in parallel. As yet another example, the cognitive logic unit 104 eliminates most of the traditional task of "programming," by replacing programming with the process of learning and then of extracting learned knowledge. For example, the cognitive logic unit 104 may extract knowledge from the knowledgebase 102 without programming as follows. The NTM 100 of FIG. 1 may receive input 106, and then: the cognitive logic unit 104 may apply deduction 116 to the input 106 to extract existing knowledge from the knowledgebase 102 representing one or more concepts associated in the knowledgebase 102 with the presented data; and/or the cognitive logic unit 104 may apply reduction 118 to the input 106 to extract existing knowledge from the knowledgebase 102 representing one or more objects (perceptions) associated in the knowledgebase 102 with the presented data. In either case, no special programming need to be performed on the NTM 100 to enable concepts or perceptions to be extracted from the knowledgebase 102. Instead, the operations of deduction 116 and/or reduction 118 may be applied to the input 106 to extract concepts and perceptions without writing a separate program.

The cognitive logic unit 104 may perform set operations on output generated by the deduction module 116 and/or the reduction module 118. For example, the cognitive logic unit 104 may receive one or more outputs from either or both of the deduction module 116 and the reduction module 118, and then perform one or more set operations on such output. Examples of such set operations include intersection, union, difference, and complement operations. The cognitive logic unit 104 may then produce output representing the outcome of performing such a set operation or operations. As a simple example, consider the following: the reduction module 118 is provided with an input representing the class of mammals and performs reduction on that input to produce output representing one or more animals which are mammals, based on the relations stored in the knowledgebase 102; the reduction module is provided with an input representing the class of animals which live in the ocean and performs reduction on that input to produce output representing one or more animals which live in the ocean, based on the relations stored in the knowledgebase 102.

Figure 2:
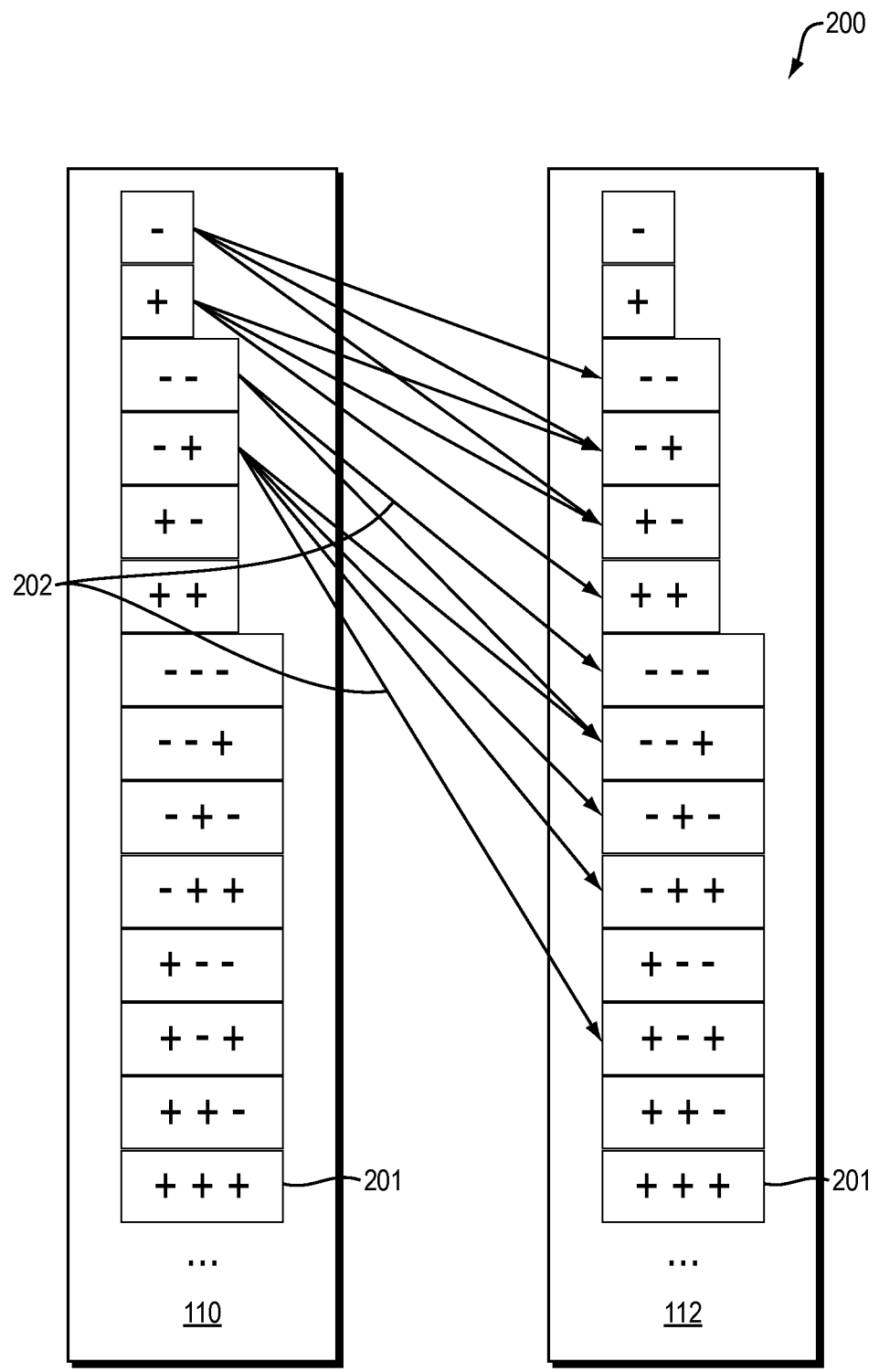
FIG. 2 is a diagram illustrating a bijective-set memory according to one embodiment of the present invention.

Of particular relevance to the present invention is the bijective-set memory 102, one embodiment of which is shown in more detail in FIG. 2 as bijective-set memory 200. The bijective-set memory 200 of FIG. 2 may be used to implement some or all of the knowledgebase 102 of FIG. 1. In the embodiment of FIG. 2, the bijective-set memory 200 includes two memories: memory 110 storing element information (also referred to as "object" information and "perception" information), and memory 112 storing set information (also referred to as "class" information, "concept" information, and "conceptual" information). Relations 201 indicate a 1 to 1 correlation between memories 110 and 112. This 1 to 1 correlation 201 indicates that the two memories 110 and 112 function like mirrors, although memory 110 is an object (element) memory and memory 112 is a class memory. Relations 202 indicate "belonging" relations, such as (− +) belongs to (− + +) and (+ − +). The bijective-set memory 200 is in an iterative structure, which contains elements that belong to sets. As a result, the data stored in the bijective-set memory 200 is also referred to as an iterative set. That is, the elements stored in the first level of the memory 200 are −1 and +1. These lowest-level (primitive) elements in the memory 200 are also referred to herein as "literals," "letters," or "characters." The elements stored in the second level of the memory 200 are combinations of two letters (e.g., (− +), (− −)), which are referred to herein as "words." Characters in the first level belong to specific words in the second level. The elements stored in the third level of the memory 200 are three-letter combinations, such as (− + −) and (+ + −), which are referred to herein as "clauses" or "triplets." Words in the second level belong to specific triplets in the third level. Elements stored at any level in the memory 200 above the third level may be represented as combinations of triplets. One of the advantages this method provides is a novel folded-graph data structure. This folded-graph data structure is able to process NP-problems as two-directional mappings instead of as a one-way function. Therefore, this method is able to solve NP-problem in polynomial time.

The NTM 100 of FIG. 1 may be used to implement a database system which stores data in the bijective-set memory 102, which represents relations among the data stored in the bijective-set memory 102, and which may be used to search the data stored in the bijective-set memory 102 without the use of SQL or other formal query languages. As described above, relational databases are limited to storing two-dimensional relationships using primary-foreign key pairs. In contrast, embodiments of the present invention may use the bijective-set memory 102 to store three-dimensional relationships of the kinds described above among data stored in the bijective-set memory 102. Furthermore, embodiments of the present invention may be used to store all data in the single bijective-set memory 102, without the need to use multiple tables. The entire database stored in the bijective-set memory 102 may be searched without the need to use SQL or other formal query languages. Because all data may be stored in the single bijective-set memory 102 without the use of multiple tables, the entire bijective-set memory 102 may be searched and the search results may be produced without the need to perform "join" operations.

Although embodiments of the present invention may be used to overcome various limitations of relational database system, embodiments of the present invention need not be used to replace all aspects of a relational database system. For example embodiments of the present invention may use a conventional relational database system to store data in a conventional manner, such as using multiple tables organized in the manner of a conventional relational database. Embodiments of the present invention may, however, be used to search such data without the need to use SQL or other formal query languages.

As another example, embodiments of the present invention may store data in the bijective-set memory 102 in a format that represents such data as multiple tables organized in the manner of a conventional relational database. In other words, the bijective-set memory 102 may be used to store data in the manner of a conventional relational database, rather than using three-dimensional relationships as disclosed herein. Embodiments of the present invention may then be used to search such data without the need to use SQL or other formal query languages.

Although embodiments of the present invention may be used to overcome various limitations of relational database systems, a vast amount of data are stored in existing relational databases. It may be useful, therefore, to transfer existing data from existing relational databases into databases stored according to embodiments of the present invention, namely by transferring the data stored in existing relational databases into the iterative set stored in the bijective-set memory 102. Such a transfer may be performed as follows.

As described above, the bijective-set memory 102 may store data and "contains" and "belongs to" relations among those data. Therefore, to convert (transfer) an existing relational database into an iterative set in the bijective-set memory, the following operations may be performed on the data in the relational database:

Each value of each field in the relational database may be stored in the element (perceptual) memory 110 of the bijective-set memory 102.

Each table in the relational database may be represented by data in the conceptual memory 112 of the bijective-set memory 102.

The bijective-set memory 102 may store data indicating a "belongs to" relationship between each field value in the perceptual memory 110 and the corresponding table to which the field value belongs in the conceptual memory 112.

Each column (field) in each table in the relational database may be represented by data in the conceptual memory 112 of the bijective-set memory 102.

The bijective-set memory 102 may store data indicating a "belongs to" relationship between each field value in the perceptual memory 110 and the column which contains that field value in the conceptual memory 112. For example, if the value of a "Hair Color" field is "black," then the value "black" may be stored in the perceptual memory 110, the field (column) type "Hair Color" may be stored in the conceptual memory 112, and the bijective-set memory 102 may store data indicating that the field value of "black" belongs to the field of "Hair Color."

The result of such a conversion is a database contained within the bijective-set memory 102. Such a database represents the same data and relations as the original relational database, but in a different form.

Querying the database contained within the bijective-set memory 102 involves providing a query which describes data and relationships among that data. In response, the NTM 100 provides search results in the form of data having the relationships specified by the query. For example, a query may request all data representing people who have the relationship of "receiver of money from" with a person having a specified name, such as "John Smith" (where "John Smith" is indicated by the query to be a name by specifying that "John Smith" belongs to the column "name"). Because relationships among data, such as the relationship "receiver of money from," are stored in the bijective-set memory 102 as relationships between the perceptual memory 110 and the conceptual memory 112, embodiments of the present invention may execute such a query and provide search results containing all of the data in the database which satisfy such a query.

Note that the example query above does not require specifying any particular tables to search. This may be because the entire database is stored in the bijective-set memory 102, which may not contain multiple tables. A query provided to the NTM 100 of FIG. 1 may, however, not specify any particular tables to search even if the NTM 100 searches data that is stored in multiple tables. If the data to be searched using the query is stored in one or more tables, then the NTM 100 may automatically determine which table(s) to search based on the query, even if the query does not specify such table(s).

Furthermore, note that the example query above does not specify a join operation. This may be because all of the data in the bijective-set memory 102 has already been joined together before the query is executed.

As the above example illustrates, a query executed by the NTM 100 according to various embodiments of the present invention may have any one or more of the following features:

- The query may lack any reference to any table(s) to be searched when executing the query.
- The query may lack any reference to a join operation.
- The query may not be written in SQL or any other formal query language.
- The query may specify one or more set relationships, such as "is a member of the following class" or "is a class that contains the following member."

Embodiments of the present invention may execute queries (searches) using each of two or more of the following kinds of operations:

Deduction. Deduction involves deducing the class(es) (conception) of a specified instance (perception). With reference to the bijective-set memory 102, deduction involves following the relationship from data representing an instance in the perceptual memory 110 to corresponding data representing a class in the conceptual memory 112. Embodiments of the present invention may perform deduction very efficiently because the instance-class relationships among data are already stored in the bijective-set memory 102. Embodiments of the present invention may use deduction to execute a term in a query which specifies a specific instance and requests the class or classes of which that instance is a member, such as "What kind of animal is a cardinal?"

Reduction. Reduction involves identifying the instance(s) (perceptions) which are members of a specified class (conception). With reference to the bijective-set memory 102, reduction involves following the relationship from data representing a class in the conceptual memory 112 to corresponding data representing an instance in the perceptual memory 110. Embodiments of the present invention may perform reduction very efficiently because the instance-class relationships among data are already stored in the bijective-set memory 102. Embodiments of the present invention may use reduction to execute a term in a query which specifies a particular class and requests the instances which are members of that class, such as "Which animals are birds?"

To illustrate certain embodiments of the present invention, particular examples of conventional relational databases and particular examples of embodiments of the present invention will now be described.

Referring to FIG. 3A, a first table 300 implemented according to a conventional relational database system is shown. The table 300 includes rows (records) 302a-c and columns 304a-d. For purposes of example, column 304a contains data in a "Name" field, column 304b contains data in a "Car" field, column 304c contains data in a "SSN" field, and column 304d contains data in a "Location" field. This table 300, therefore, contains data representing people (column 304a) who purchased cars manufactured by particular car manufacturers (column 304b) in particular locations (column 304d). Column 304c contains data representing the Social Security Number (SSN) of each person.

Embodiments of the present invention may be used to store and/or search data in the table 300 of FIG. 3A. For example, the table 300 of FIG. 3A may be stored in a relational database which is external to the NTM 100 of FIG. 1. As another example, embodiments of the present invention may store the data from the table 300 of FIG. 3A in the bijective-set memory 102 of the NTM 100, either using three-dimensional relationships or using conventional relationships of the type used by conventional relational databases. Regardless of how and where the data of the table 300 is stored, the NTM 100 of FIG. 1 may be used to search that data using the techniques disclosed herein.

Referring to FIG. 3B, a second table 320 implemented according to the conventional relational database system of FIG. 3A is shown. This table 320 contains data about people, such as one or more of the people represented as car buyers in the table 300 of FIG. 3A. The table 320 includes rows (records) 322a-c and columns 324a-d. Each of the rows 322a-c contains data about a particular person. For purposes of example, column 324a contains data in a "Name" field, column 324b contains data in a "Telephone" field, and column 324c contains data in a "SSN" field. For each row representing a particular person, the "Name" column 324a contains data representing the person's name, the "Telephone" column 324b contains data representing the person's telephone number, and the "SSN" column 324c contains data representing the person's Social Security Number.

Embodiments of the present invention may be used to store and/or search data in the table 320 of FIG. 3B. For example, the table 320 of FIG. 3B may be stored in a relational database which is external to the NTM 100 of FIG. 1. As another example, embodiments of the present invention may store the data from the table 320 of FIG. 3B in the bijective-set memory 102 of the NTM 100, either using three-dimensional relationships or using conventional relationships of the type used by conventional relational databases. Regardless of how and where the data of the table 320 is stored, the NTM 100 of FIG. 1 may be used to search that data using the techniques disclosed herein.

Referring to FIG. 3C, a third table 340 implemented according to the conventional relational database system of FIG. 3B is shown. This table 340 contains data about people, such as one or more of the people represented as car buyers in the table 300 of FIG. 3A. The table 340 includes rows (records) 342a-c and columns 344a-d. Each of the rows 342a-c contains data about a particular person. For purposes of example, column 344a contains data in a "Name" field, column 344b contains data in an "Age" field, and column 344c contains data in a "SSN" field. For each row representing a particular person, the "Name" column 344a contains data representing the person's name, the "Age" column 344b contains data representing the person's age, and the "SSN" column 344c contains data representing the person's Social Security Number.

Embodiments of the present invention may be used to store and/or search data in the table 340 of FIG. 3C. For example, the table 340 of FIG. 3A may be stored in a relational database which is external to the NTM 100 of FIG. 1. As another example, embodiments of the present invention may store the data from the table 340 of FIG. 3C in the bijective-set memory 102 of the NTM 100, either using three-dimensional relationships or using conventional relationships of the type used by conventional relational databases. Regardless of how and where the data of the table 340 is stored, the NTM 100 of FIG. 1 may be used to search that data using the techniques disclosed herein.

As can be seen from a visual inspection of the tables 300, 320, and 340, all of the tables 300, 320, and 340 contain data about a person named Karen Brown. In a conventional relational database system, to execute a query on the database containing the tables 300, 320, 340, in order to extract information about Karen Brown, it would be necessary to write a query in a formal query language, such as SQL, based on prior knowledge of the structure of the tables 300, 320, and 340 (e.g., knowledge of the columns in the tables 300, 320, and 340, and knowledge of which columns serve as primary keys and foreign keys in relation to each other), and then to execute that query. Executing such a query in a conventional relational database system involves performing a join operation on the data stored in the tables 300, 320, and 340.

In contrast, certain embodiments of the present invention may store data representing information similar to that shown in FIGS. 3A-3C, but without using multiple tables, although in certain other embodiments of the present invention the data of FIGS. 3A-3C may be stored using multiple tables. Furthermore, certain embodiments of the present invention may execute a query on such data without searching multiple tables, although certain other embodiments of the present invention the NTM 100 may search multiple tables. Furthermore, embodiments of the present invention may search the data of FIGS. 3A-3C without executing a join operation. Furthermore, a query executed by embodiments of the present invention need not be written in a formal query language, such as SQL, and need not be based on prior knowledge on the structure of the data to be searched.

For example, referring to FIG. 4A, a first portion 400 of a table is shown which is implemented according to one embodiment of the present invention. Such a table portion 400 may be stored in the bijective-set memory 102. This table portion 400 contains a key column 404a and an attributes column 404b. The table portion 400 contains rows 402a-f, each of which contains a key and a corresponding attribute name or identifier. In this way, the table portion 400 provides a unified mapping between keys and attributes.

Similarly, referring to FIG. 4B, a second portion 410 of the table is shown which is implemented according to one embodiment of the present invention. Such a table portion 410 may be stored in the bijective-set memory 102. Note that the table portion 400 of FIG. 4A and the table portion 410 of FIG. 4B may be stored in the bijective-set memory 102 as different portions of the same table or as different tables. The table portion 410 shown in FIG. 4B contains a key column 414a and a value column 414b. The table portion 410 contains rows 412a-i, each of which contains a key and a corresponding value. In this way, the table portion 410 provides a unified mapping between keys and values. Note that although the column 414b is labeled as "Value" in FIG. 4B and the column 404b is labeled as "Attributes" in FIG. 4A, both of these columns may be the same column in the same table, but interpreted differently from each other.

Figure 4C:
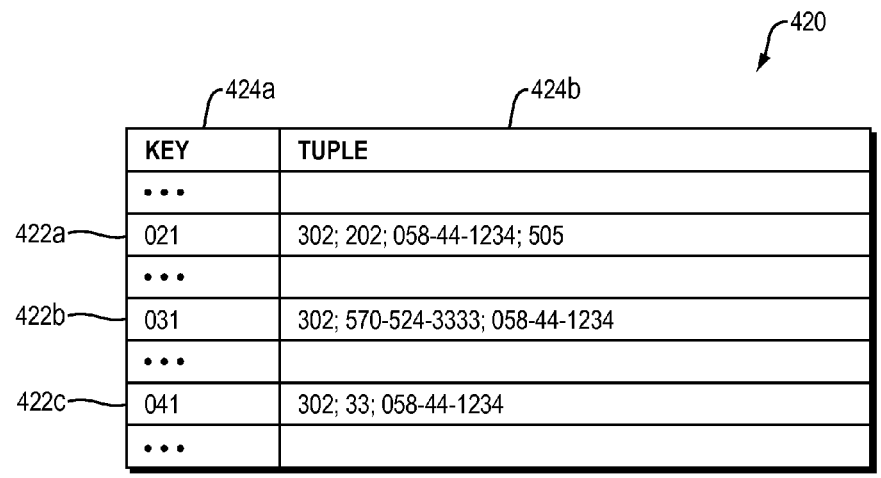

Referring to FIG. 4C, a third portion 420 of the table is shown which is implemented according to one embodiment of the present invention. Note that the table portion 400 of FIG. 4A, the table portion 410 of FIG. 4B, and the table portion 420 of FIG. 4C may be stored in the bijective-set memory 102 as different portions of the same table or as different tables. The table portion 420 shown in FIG. 4C contains a key column 424a and a tuple column 424b. The table portion 420 contains rows 422a-c, each of which contains a key and a corresponding tuple. For example, row 422a contains the key 021 and the corresponding tuple 302; 202; 058-44-1234; 505. This means that the key 021 is associated with:

the key 302 (which is associated with the value "Karen Brown" in the table portion 410 of FIG. 4B);
the key 202 (which is associated with the value "Toyota" in the table portion 410 of FIG. 4B);
the key 058-44-1234 (which should be assumed to be a key in another table portion which is not shown in the drawings); and
the key 505 (which is associated with the value "Boston" in the table portion 410 of FIG. 4B).

As the example above illustrates, the table portion 420 of FIG. 4C provides a unified mapping between a set of unified keys and a plurality of tuples. In this way, the table portion 420 of FIG. 4C represents relations using mappings between keys and tuples. As the example above further illustrates, embodiments of the present invention may use a single table (such as the single table which contains all of the table portions 400, 410, and 420 of FIGS. 4A, 4B, and 4C) to represent at least the same relations as a conventional relational database requires multiple tables to represent.

The table(s) represented by FIGS. 3A, 3B, 3C, 4A, 4B, and 4C may be searched (queried) using highly efficient techniques according to embodiments of the present invention. For example, FIG. 5 illustrates one method of querying a table according to one embodiment of the present invention. Assume for purposes of example that the query executed by the method of FIG. 5A is the query, "What is the telephone number of the person who bought a Toyota in Boston?" Note that this query does not specify any table(s) to query, does not specify a join operation, and is not written in SQL or another formal query language.

Figure 5A:
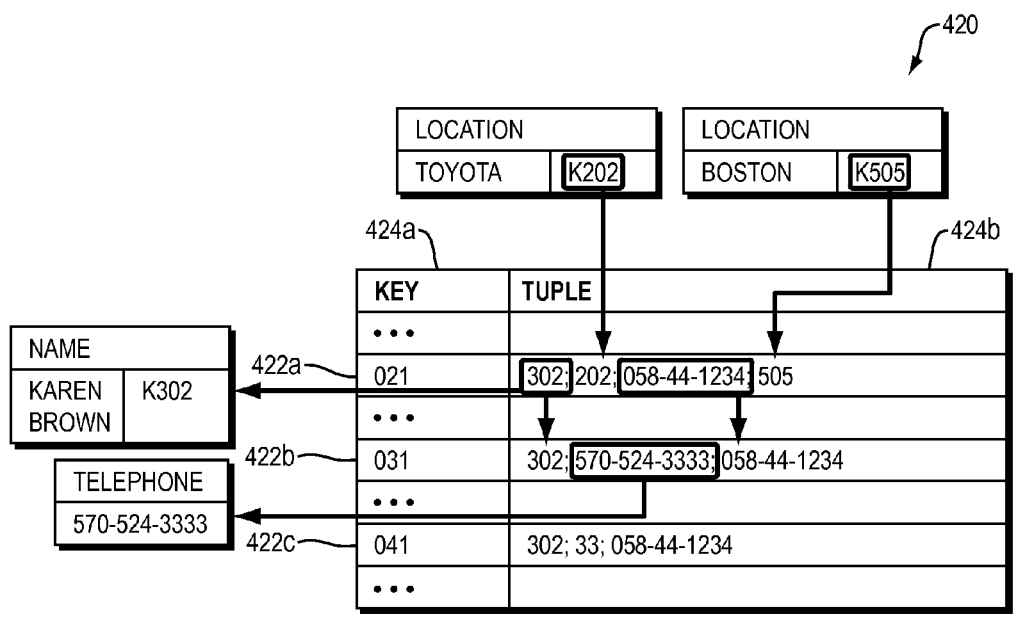
FIGS. 5A-5B illustrate methods of searching the table of FIGS. 4A-4C according to embodiments of the present invention.

FIG. 5A shows the same table portion 420 as in FIG. 4C. To execute the query, "What is the telephone number of the person who bought a Toyota in Boston?", the method of FIG. 5A may search the table portion 420 for keys representing the values specified by the query, such as "Toyota" and "Boston." The method may search the table portion 420 and find any such matching keys, such as the key 202, which represents the value of "Toyota" (according to the table portion 410 of FIG. 4B), and the key 505, which represents the value of "Boston" (according to the table portion 410 of FIG. 4B).

The method of FIG. 5A may then identify the record containing the matching values of "Toyota" and "Boston," namely the record 422a. The method of FIG. 5A may conclude that this record 422 represents a person who bought a Toyota in Boston. The method may then identify the primary key of the identified record 422, namely the key 302. The method of FIG. 5A may conclude that this key 302 is an identifier of a person who bought a Toyota in Boston. Now the method of FIG. 5A must find the telephone number of this person.

The method of FIG. 5A may find the telephone number of the person who bought a Toyota in Boston by searching the table portion 420 for the value 302 as a primary key. The method finds this key in record 422b. The method may then examine each of the elements of record 422b other than the key 302 and determine whether each element represents a telephone number. The method may make such a determination by, for example, determining whether each element is classified as a telephone number elsewhere in the table, or in another table in the same database. For example, the method of FIG. 5A may determine, based on record 412e in table portion 410 (FIG. 4B), that primary key 302 relates to Karen Brown. The method of FIG. 5A may then determine, based on FIG. 3B, that Karen Brown's telephone number is 570-524-3333, because column 324b of the table 320 in FIG. 3B is labeled as "Telephone," and because the contents of column 324b in the record 322b representing Karen Brown contains 570-524-3333. The method may, therefore, conclude that the number 570-524-3333 in the table portion 420 is a telephone number.

The method may conclude, based on the inferences above, that the telephone number of the person who purchased a Toyota in Boston is 570-524-3333. Note that the method may draw this conclusion without performing a join operation. Additionally or alternatively, the method may draw this conclusion by executing a query which is not written in SQL or another formal query language.

Figure 5B:
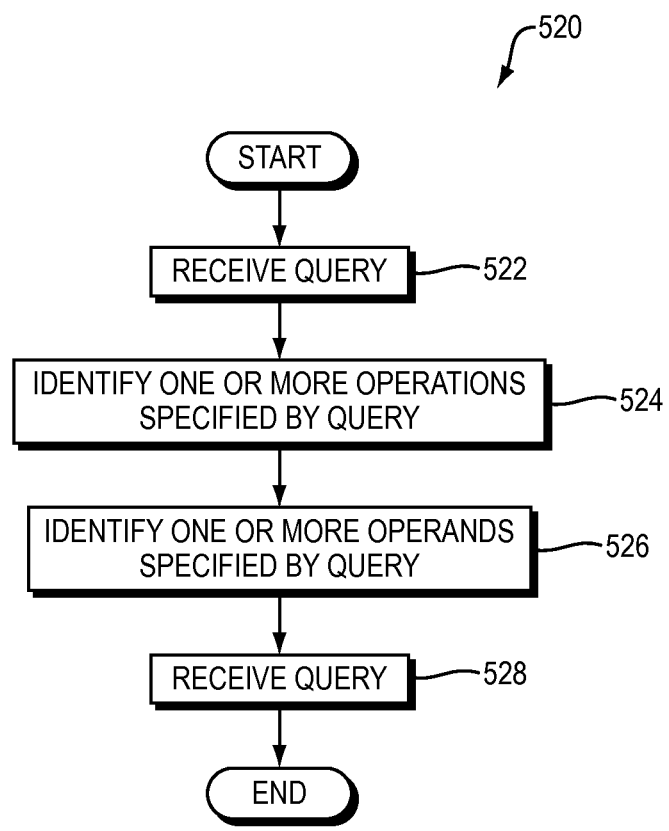

FIG. 5A illustrates a method of querying a database according to one embodiment of the present invention by reference to a particular example of a query and a particular example of a database. Referring now to FIG. 5B, a flowchart is shown which illustrates a more general method 520 for query a database according to various embodiments of the present invention. The method 520 may be performed by the NTM 100 of FIG. 1.

The method 520 of FIG. 5B receives a query (operation 522). The input 106 (FIG. 1) may, for example, represent a query, and the input 106 may be provided to the cognitive logic unit 104. The cognitive logic unit 104 may receive the query from any of a variety of sources, such as a human user who provides the query to the cognitive logic unit 104 manually using any of a variety of input devices (such as a keyboard, mouse, trackpad, and/or touchscreen). As another example, the cognitive logic unit 104 may receive the query from a computer program or computing device. The query may be stored in a non-transitory computer-readable medium (such as in the bijective-set memory 102). The query may be stored in any format which makes it readable by the NTM 100.

As described above, the query need not be represented in SQL or another formal query language. The query may be represented in any of a variety of forms. For example, as the example of FIG. 5A illustrates, the query may be written in English or another natural language. As another example, the query may not specify any particular tables to be queried when the query is executed by the NTM 100, whether or not the query is written in a formal language. As another example, the query may not specify a join operation, and the NTM 100 may not perform a join operation when it executes the query, whether or not the query is written in a formal language.

The query may specify one or more of:

A deduction operation to be performed on a specified instance of a class. For example, the query may specify a particular person (e.g., Karen Brown) and specify that the operation of deduction is to be performed on this instance, so that when the NTM 100 executes the query, the deduction module 116 performs deduction on the specified instance (e.g., Karen Brown) and identifies one or more classes (e.g., purchasers of Toyotas) of which the specified instance is a member.

A reduction operation to be performed on a specified class. For example, the query may specify a particular class (e.g., purchasers of Toyotas) and specify that the operation of reduction is to be performed on this class, so that when the NTM 100 executes the query, the reduction module 118 performs reduction on the specified class (e.g., purchasers of Toyota) and identifies one or more instances which are members of the specified class (e.g., Karen Brown).

Any set operation, such as intersection, union, difference, and complement to be performed on one or more specified classes. For example, the query may specify that an intersection operation is to be performed on the class of people who purchased Toyotas and the class of people who purchased cars in Boston. When the NTM 100 executes such a query, the NTM 100 may perform the specified set operation on the specified class(es), and produce the resulting class (set) as output. For example, the NTM 100 may perform an intersection operation on the class of people who purchased Toyotas and the class of people who purchased cars in Boston, and produce as an output the class of people who purchased Toyotas in Boston.

It is stated above that the query may "specify" one or more operations. It should be understood that a query may specify an operation in any of a variety of ways. For example, a query may specify an operation explicitly, such as by including a keyword (e.g., "deduce") explicitly representing an operation. As another example, a query may specify an operation implicitly, as in the case of the natural language query, "What is the telephone number of a person who purchased a Toyota in Boston?" Such a query implicitly specifies a deduction operation, but does not explicitly include the term "deduction" or any other similar term explicitly representing the operation of deduction. Instead, embodiments of the present invention may infer that such a natural language query specifies the operation of deduction using the techniques disclosed herein.

The query may include one or more of any of the kinds of operations indicated above, in any combination, in any sequence, and connected by any logical operators (e.g., AND, OR, NOT, and XOR). If the query is not written in a formal query language, then the NTM 100 may use any of a variety of techniques, such as any of a variety of well-known natural language processing (NLP) techniques, to identify the operators and operands specified by the query. The NTM 100 may then execute the query by executing the identified operators on the identified operands to produce output 108, which represents the result of executing the identified operators on the identified operands. The NTM 100 may, therefore, execute a query that is written in a natural language, without requiring the person who writes the query to write the query in SQL or any other structured language.

Returning to FIG. 5B, the NTM 100 may identify and extract from the query one or more operations (such as one or more of deduction, reduction, intersection, union, difference, and complement) specified by the query (FIG. 5B, operation 524). The NTM 100 may also identify and extract from the query one or more operands (such as classes and/or instances) specified by the query (FIG. 5B, operation 526). As part of operations 524 and 526, the NTM 100 may identify the associations between the identified operations and operands. For example, the NTM 100 may identify that the query specifies that a particular reduction operation is to be performed on a particular class specified by the query. As another example, the NTM 100 may identify that the query specifies that a particular deduction operation is to be performed on a particular instance specified by the query. As another example, the NTM 100 may identify that the query specifies that a particular intersection operation is to be performed on two particular classes specified by the query.

The NTM 100 may then perform each of the identified operations on each of the identified operands to produce query output, which may take the form of the output 108 in FIG. 1 (FIG. 5B, operation 528). Performing the operations in the query may involve performing a first operation to produce a first intermediate output, then performing a second operation to perform a second intermediate output, and so on until the final output 108 is produced. Operations may be performed on previously-produced intermediate outputs.

The operations identified in operation 524 and the operands identified in operation 526 may not specify any particular table(s). The NTM 100 may automatically identify the table(s) on which to perform the operations identified in operation 524. For example, if a particular operation specifies that people who are members of the class of car purchasers are to be identified, then the NTM 100 may automatically identify a table containing car purchasers, and may then search that table as part of executing the query. In this way, the NTM 100 may search one or more appropriate tables when executing the query, even though the query did not specify the table(s) to be searched.

Furthermore, the NTM 100 may execute the query without performing a join operation. This may be because the data in the bijective-set memory 102 has already effectively been joined by storing relationships among the data in the bijective-set memory 102 as described above.

Another benefit of embodiments of the present invention is that they may be used to easily integrate information from two or more conventional databases into a single database. For example, embodiments of the present invention may be used to easily merge two or more bank databases. The resulting merged database may be divided into two or more separate domains. This ability enables embodiments of the present invention to guarantee all three of consistency, availability, and partition tolerance, in contravention of the CAP theorem, also known as Brewer's theorem. The CAP theorem states that it is impossible for a distributed computer system to simultaneously provide all three of the following guarantees: consistency (all nodes see the same data at the same time), availability (a guarantee that every request receives a response about whether it succeeded or failed), and partition tolerance (the system continues to operate despite arbitrary partitioning due to network failures). Embodiments of the present invention can simultaneously provide all three of these guarantees in a distributed computer system.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may search a knowledgebase containing thousands or millions of records in less than one second. As particular examples, embodiments of the present invention may search a knowledgebase containing at least one thousand, at least ten thousand, at least one million, or at least ten million records in less than one second. No human could perform such a search so quickly. The ability to perform searches this quickly provides embodiments of the present invention with benefits which would not be obtained by a manual or mental search.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor, the method comprising:
   (1) storing data representing a plurality of classes and a plurality of instances in a bijective-set memory;
   (2) storing data representing class membership relationships between the plurality of classes and the plurality of instances in the bijective-set memory;
   (3) receiving data representing a query, wherein the query does not specify any table;
   (4) identifying an operation specified by the query;
   (5) identifying an operand specified by the query;
   (6) executing the query, comprising:
      (6) (a) identifying a table to be searched, based on the query; and
      (6) (b) performing the operation on the operand, including searching the identified table, to produce an output;
   wherein (1) comprises storing the data representing the plurality of classes and the plurality of instances in a single table in the bijective-set memory, and wherein (2) comprises storing the data representing the class membership relationships between the plurality of classes and the plurality of instances in the single table in the bijective-set memory.

2. The method of claim 1, wherein the query is written in a natural language.

3. The method of claim 1, wherein the query is not written in Structured Query Language.

4. The method of claim 1, wherein the query is not written in a structured language.

5. The method of claim 1, wherein the operation comprises a reduction operation.

6. The method of claim 1, wherein the operation comprises a deduction operation.

7. The method of claim 1, wherein the operation comprises an intersection operation.

8. The method of claim 1, wherein the operation comprises a union operation.

9. The method of claim 1, wherein the operation comprises a difference operation.

10. The method of claim 1, wherein the operation comprises a complement operation.

11. The method of claim 1, wherein (1), (2), (3), (4), (5), and (6) are performed by a nondeterministic Turing machine.

12. A non-transitory computer-readable medium comprising computer program instructions stored thereon, wherein the computer program instructions are executable by at least one computer processor to perform a method, the method comprising:
   (1) storing data representing a plurality of classes and a plurality of instances in a bijective-set memory;
   (2) storing data representing class membership relationships between the plurality of classes and the plurality of instances in the bijective-set memory;
   (3) receiving data representing a query, wherein the query does not specify any table;
   (4) identifying an operation specified by the query;
   (5) identifying an operand specified by the query;
   (6) executing the query, comprising:
      (6) (a) identifying a table to be searched, based on the query; and
      (6) (b) performing the operation on the operand, including searching the identified table, to produce an output;
   wherein (1) comprises storing the data representing the plurality of classes and the plurality of instances in a single table in the bijective-set memory, and wherein (2) comprises storing the data representing the class membership relationships between the plurality of classes and the plurality of instances in the single table in the bijective-set memory.

13. The non-transitory computer-readable medium of claim 12, wherein the query is written in a natural language.

14. The non-transitory computer-readable medium of claim 12, wherein the query is not written in Structured Query Language.

15. The non-transitory computer-readable medium of claim 12, wherein the query is not written in a structured language.

16. The non-transitory computer-readable medium of claim 12, wherein the operation comprises a reduction operation.

17. The non-transitory computer-readable medium of claim 12, wherein the operation comprises a deduction operation.

18. The non-transitory computer-readable medium of claim 12, wherein the operation comprises an intersection operation.

19. The non-transitory computer-readable medium of claim 12, wherein the operation comprises a union operation.

20. The non-transitory computer-readable medium of claim 12, wherein the operation comprises a difference operation.

21. The non-transitory computer-readable medium of claim 12, wherein the operation comprises a complement operation.

22. The non-transitory computer-readable medium of claim 12, wherein (1), (2), (3), (4), (5), and (6) are performed by a nondeterministic Turing machine.

* * * * *